United States Patent [19]

Catanzarite

[11] 4,170,693

[45] Oct. 9, 1979

[54] COATING FOR LITHIUM ANODE, THIONYL CHLORIDE ACTIVE CATHODE ELECTROCHEMICAL CELL

[76] Inventor: Vincent O. Catanzarite, 356 Desert Inn Rd., Las Vegas, Nev. 98109

[21] Appl. No.: 840,521

[22] Filed: Oct. 11, 1977

[51] Int. Cl.$^2$ ............................................. H01M 6/14
[52] U.S. Cl. ..................................... 429/48; 429/101; 429/199; 29/623.1
[58] Field of Search ................. 429/48, 101, 218, 194, 429/196, 199, 212, 214; 29/623.1

[56] References Cited

U.S. PATENT DOCUMENTS

| | | | |
|---|---|---|---|
| 3,716,410 | 2/1973 | Butler et al. | 429/199 |
| 3,993,501 | 11/1976 | Kainoki-Kis | 429/101 X |
| 4,020,240 | 4/1977 | Schlaikjer | 429/196 X |

*Primary Examiner*—Anthony Skapars
*Attorney, Agent, or Firm*—Thomas H. Williams

[57] ABSTRACT

Electrochemical power cells having a cathode current collector, a combination liquid active cathode depolarizer electrolyte solvent and an anode that forms surface compounds when in intimate contact with the liquid cathode are enhanced by the addition of a passivation limiting film contiguous to said anode.

15 Claims, No Drawings

COATING FOR LITHIUM ANODE, THIONYL CHLORIDE ACTIVE CATHODE ELECTROCHEMICAL CELL

BACKGROUND OF THE INVENTION

This invention relates to electrochemical cells and batteries. More particularly, it relates to lithium anode, thionyl chloride active cathode depolarizer cells and the use of additive films to enhance their performance.

The recent growth in portable electronic products requiring electrochemical power cells for energy has highlighted the definiencies of existing power cells for demanding applications. In an effort to improve the electrochemical cell technology, much attention has been given to perfecting what is generally referred to as lithium batteries. More precisely, this means electrochemical cells using a highly reactive anode such as lithium in combination with varying cathode and electrolyte materials. Indeed the literature is replete with examples of lithium anode cells having different cathodes and electrolytes. The interest in this cell technology stems from a recognition that such cells theoretically provide higher energy densities, higher voltages, wider temperature operating ranges, longer shelf lives, and lower cost.

Among all the known combinations of lithium anodes with different cathodes and electrolytes, those believed to have among the highest energy density and current delivery capability use certain inorganic liquids as the active cathode depolarizer. This type of cell chemistry is commonly referred to as liquid cathode.

The use of a liquid as an active cathode depolarizer is a radical departure from conventional cell technology. Until recently, it was generally believed that the active cathode depolarizer could never directly contact the anode. However, it has recently been discovered that certain active cathode materials do not react chemically to any appreciable extent with an active anode metal at the interface between the metal and the cathode material, thereby allowing the cathode material to contact the anode directly.

Early liquid cathode cells use liquid sulfur dioxide active cathode depolarizer and are described in U.S. Pat. No. 3,567,515 issued to Maricle, et al. on Mar. 2, 1971. Since sulfur dioxide is not a liquid at room temperature and at atmospheric pressure, it proved to be a difficult chemistry with which to work.

A major step forward in the development of liquid cathode cells was the discovery of a class of inorganic materials, generally called oxyhalides, that are liquids at room temperature. These materials perform the function of active cathode depolarizer. Additionally, they may also be used as the electrolyte solvent. Liquid cathode cells using oxyhalides are discribed in U.S. Pat. No. 3,926,669 issued to Auborn on Dec. 16, 1975 and in British Pat. No. 1,409,307 issued to Blomgren, et al. on Oct. 18, 1975. At least one of the oxyhalides, thionyl chloride ($SOCl_2$), in addition to having the general characteristics discribed above, also provides substantial additional energy density and current delivery capability.

The liquid cathode systems, however, have suffered from two major problems that have prevented their wide spread use. First, they can be dangerous under certain circumstances, and secondly, high current rate batteries could not be made with good long term storage characteristics.

The first of these problems is addressed by copending application, Ser. No. 828,493, filed on Aug. 29, 1977 in the name of Louis R. Giattino and assigned to the same assignee as the present application.

The second problem is the subject of the present application. This problem manifests itself in two principal ways. First, there is a voltage delay after storage at elevated temperatures. That is, after cells have been stored at temperatures exceeding room temperatures, the cell voltage under moderate discharge loads requires some period of time, running between several seconds and several hours, to approach the level it would have instantly achieved prior to storage. Secondly, cells that can reliably deliver current rates of 7 or better ma per sq cm are difficult to achieve. Taken together, these two problems are generally referred to as the passivation phenomena.

Studies have indicated that passivation results from a build-up of compounds on the surface of the lithium anode. These compounds are not presently well understood; however, it is generally believed that they are the product of a reaction between the lithium and one or more of the following: The electrolyte solvent, the electrolyte solute, or impurities particularly iron.

If cells are assembled carefully, passavation can be minimized in fresh batteries. However, storage, particularly at elevated temperatures, causes passivation to occure rapidly.

Others have attempted to solve the passivation problem in a variety of ways. One approach was to partially discharge cells prior to storage. A second approach was to increase the roughness factor of the anode by etching prior to assembly. A third approach was to pretreat the cathode current collector to eleminate impurities. Other approaches including the introduction of certain inorganic material such as water and sulfur dioxide have also been tried. However, to date, all known approaches have made little impact on the passivation problem.

It is therefore an object of this invention to reduce the passivation phenomenon in liquid cathode cells.

It is another object of the invention to provide an improvement in voltage delays for lithium anode, liquid cathode cells.

It is another object of the invention to provide improved current rate delivery capability for lithium anode, liquid cathode cells.

It is yet another object of this invention to reduce passivation in lithium anode, thionyl chloride cells.

Finally, it is an object of this invention to provide improved storage characteristics for lithium anode, liquid cathode cells.

SUMMARY OF THE INVENTION

The basis of this invention is the discovery that the application of certain organic films to the anode or separator material substantially mitigates the passivation problem. According to this invention, passivation in an electrochemical cell having a reactive metal anode in combination with a liquid cathode such that compounds tend to form on the surface of said anode are reduced by a coating positioned contiguous to the anode that interacts with the cell chemistry to inhibit the formation of compounds on the anode while allowing lithium ions to pass therethrough. In particular, organic compounds that cure from a liquid to an adherent film may be applied to the anode and or separator prior to assembly. In lithium anode, thionyl chloride cathode depolarizer cells, the class of organic compounds known as cyanoacrylics may be used.

DETAILED DESCRIPTION OF PREFERRED EMBODIMENTS

The anode is preferably lithium or alloys of lithium. Other useful anode materials would generally be consumable metals such as alkali metals or alkali earth metals and alloys and or compounds of such metals that form passivation layers when incorporated in an electrochemical cell with a liquid cathode.

The electrolyte solvent which is also the cathode depolarizer is perferably thionyl chloride. Other useful electrolyte solvents are oxyhalides of elements of Group V and VI of the periodic Table. Some examples are given in Table I of the Bolmgren patent.

The electrolyte solute may be simple of double salt which will produce an ionically conductive solution when dissolved in the solvent. Preferred soluties are complexes of inorganic or organic Lewis acids and inorganic ionizable salts. The requirements for utility are that the salt, whether simple or complex, be compatible with the solvent employed and that it yield a solution which is ionically conductive. According to the Lewis or electronic concept of acids and bases, many substances which contain no active hydrogen can act as acids or acceptors or electron doublets. In U.S. Pat. No. 3,542,602 it is suggested that the complex or double salt formed between a Lewis acid and ionizable salt yields an entity which is more stable than either of the components alone.

Typical Lewis acids suitable for use in the present invention include aluminum chloride, antimony pentachloride, zirconium tetrachloride, phosphorus pentachloride, boron fluoride, boron chloride and boron bromide.

Ionizable salts useful in combination with the Lewis acids include lithium floride, lithium chloride, lithium bromide, lithium sulfide, sodium fluoride, sodium chloride, sodium bromide, potassium fluoride, potassium chloride and potassium bromide.

The double salts formed by a Lewis acid and an inorganic ionizable salt may be used as such or the individual components may be added to the solvent separately to form the salt. One such double salt, for example, is that formed by the combination of aluminum chloride and lithium chloride to yield lithium aluminum tetrachloride.

In addition to an anode, active cathode depolarizer and ionically conductive electrolyte, these cells require a cathode current collector.

Generally any compatible solid which is substantially electrically conductive and inert in the cell can be used as a cathode current collector since the function of the collector is to permit external electrical contact to be made with the active cathode material. It is desirable to have as much surface contact as possible between the liquid cathode and the current collector. Therefore, a porous material is preferred since it will provide a high surface area interface with the liquid cathode material. The current collector may be metallic and may be present in any physical form such as metallic film, screen or a pressed powder. Examples of some suitable metal current collectors are provided in Table II aof the Auborn Patent. The current collector may also be made partly or completely carbon.

Electrical separation of current collector and anode is required to insure that cathode or anode reactions do not occure unless electrical current flows through an external circuit. Since the current collector is insoluble in the electrolyte and the anode does not react spontaneously with the electrolyte, a mechanical separator may be used. Materials useful for this function are discribed in the Auborn Patent.

Although the varied cells discribed in the Blomgren and Auborn Patents are feasible, and the present invention is applicable thereto much of the recent interest is in cells using thionyl chloride as the active cathode depolarizer and electrolyte solvent. This results from thionyl chloride's apparent ability to provide greater energy density and current delivery capability than other liquid cathode systems. Yet even though thionyl chloride cells have proven to be the best performer among the liquid cathode systems their performance still suffers from passivation.

The following examples and tables illustrate the improvement the present invention makes to cells using thionyl chloride as the active cathode depolarizer. These examples and data are given as examples only and are not intended to in any way limit the invention.

All of the following examples were manufactured in the same way and are as close to identical as practical except for the specific chemical coating that are the subject of this invention and the specific manner in which these coatings are applied to cell components.

The examples are button type cells having a stainless steel can measuring 0.880 inches outside diameter and 0.150 inch maxium height and having a nominal internal volumn of 0.035 cubic inches. The anode is a single disk of lithium, 0.680 inches in diameter by 0.020 inches in thickness. The separator is a commerically available 95% $AL_2O_3$ ceramic paper that was baked out at 500° C. The current collector is acetylene black compacted into a pellet. The electrolyte is a 1.4 molar solution of lithium aluminum tetrachloride in thionyl chloride. The cell is hermetically sealed by a high quality ceramic-to-metal seal. To the basic cell described above, a variety of coatings were introduced. The basic manufacturing process involves a straight forward assembly of components by conventional means. The coatings are most conveniently applied to particular componets prior to assembly. Immediately after assembly, cells containing coatings may exhibit a higher internal impedance than cells without coating. This phenomenon is eleminated by a "burn in" procedure which consists of exposing the cells with coating to elevated temperatures for a certain period of time. The temperature and duration of exposure are interdependent, and must be determined impirically for each coating. This may be simply accomplished by monitoring the internal impedance of sample cells overtime at some suitable temperature. Generally speaking there is an inverse relationship between exposure time and the temperature to which the cells are exposed. A recommended temperature is 71° C. Each of the following examples discribed a particular coating, its method of application and burn in procedure.

EXAMPLE 1

A thin layer of methyl cyanoacrylate is placed on both sides of the lithium disk and allowed to harden prior to assembly. This chemical is a thin liquid prior to curing and may be applied in any way that yields a thin uniform coating. To aid in applying a thin uniform coating, the material may be diluted with methyl ethyl ketone. After assembly, cells are "burned in" for approximately twelve hours at 71° C.

EXAMPLE 2

In this example, methyl cyanoacrylate is placed on the separator material only and allowed to dry prior to assembly. A preferable method of application is dipping. After assembly, cells are burned in for approximately twelve hours at 71° C.

EXAMPLE 3

In this example methyl cyanoacrylate is applied to both the lithium anode and the separator material and allowed to harden prior to assembly. After assembly, cells are burned in for approximately 12 hours at 71° C.

EXAMPLE 4

In this example, ethyl cyanoacrylate is applied to the lithium and allowed to harden prior to assembly. After assembly, the batteries are baked out at 71° C. for approximately 48 hours.

EXAMPLE 5

In this example, ethyl cyanoacrylate is applied to the separator material only and allowed to harden prior to assembly. After assembly, the batteries are baked out at 71° C. for approximately 48 hours.

EXAMPLE 6

In this example, ethyl cyanoacrylate is appled to both the anode and the separator material and allowed to harden prior to assembly. After assembly, the cells were baked out at 71° C. for approximately 48 hours.

TEST PROCEDURE

A substantial quantity of cells of each example were manufactured and tested. The test procedure was the same for all cells in all examples. Immediately after burn in, cells are discharged to measure inital life. The discharge rate is 10 milliamperes; the test temperature is 25° C.; and the cutoff voltage for determining service life is 2.4 volts. After burn in, cells are stored in ovens at a controlled temperature of 71° C. Cells are removed on a periodic basis and their service life measured as described above. In addition voltage delay is measured. The results of these tests are given in Table I below. Sample C is a control sample having no coating.

TABLE I

| | VOLTAGE DELAY AND LOSS OF LIFE AFTER ELEVATED TEMPERATURE STORAGE | | | | |
|---|---|---|---|---|---|
| | | SECONDS TO REACH 2 VOLTS ON 60 OHM LOAD | | | |
| | DAYS AT 71° C. | AFTER STORAGE AT 71° C. FOR: | | | |
| SAMPLE | To 50% OF LIFE | 1 DAY | 3 DAYS | 8 DAYS | 21 DAYS |
| c | 2 | never | never | never | never |
| 1 | 12 | less than 1 | less than 1 | 5 | 20 |
| 2 | 12 | less than 1 | less than 1 | 5 | 20 |
| 3 | 12 | less than 1 | less than 1 | 5 | 20 |
| 4 | | less than 1 | less than 1 | 2 | 10 |
| 5 | 28 | less than 1 | less than 1 | 2 | 10 |
| 6 | 28 | less than 1 | less than 1 | 2 | 10 |

In addition to the foregoing samples, other materials, particularly ethyl acetate and acrylonitrile have proven effective at reducing passivation.

What is claimed is:
1. An electrochemical cell comprising:
(a) a cathode current collector;
(b) an anode mechanically spaced from said cathode current collector; p1 (c) an ionically conductive electrolyte in physical contact with said anode and cathode current collector; said electrolyte consisting of a solute dissolved in a solvent that also performs the function of active cathode depolarizer, said electrolyte reacting with said anode to form surface compounds thereon;
(d) a surface compound limiting film contiguous to said anode, said film consisting of an organic compound selected from the group consisting of methyl cyanoacrilate and ethyl cyanoacrylate.
2. The electrochemical cell of claim 1, wherein said anode is lithium.
3. The electrochemical cell of claim 2, wherein said electrolyte solvent is thionyl chloride.
4. The electrochemical cell of claim 3, wherein said passivation limiting film is methyl cyanoacrylate.
5. The electrochemical cell of claim 3, wherein said passivation limiting layer is ethyl cyanoacrylate.
6. An electrochemical cell comprising:
(a) a cathode current collector;
(b) an anode that spontaneously reacts with other cell chemicals to form surface compounds, said anode being mechanically spaced from said current collector;
(c) an ionically conductive electrolyte in physical contact with said anode and cathode current collector, said electrolyte consisting of a solute dissolved in a solvent that also is the active cathode depolarizer; and
(d) a passivation limiting film contiguous to said anode, said film consisting of ethyl acetate.
7. In an electrochemical cell having a lithium anode, a cathode current collector spaced from said anode, an ionically conductive electrolyte consisting of a solution of lithium aluminum tetrachloride in thionyl chloride, the improvement comprising:
a separator positioned betweeen said anode and said cathode current collector, said separator being substantially inert to said cell chemicals and wherein said separator is coated with a passivation inhibiting organic coating applied in liquid form that dries to an adherent film, said coating selected from the group consisting of methyl cyanoacrilate, ethyl cyanoacrilate, ethyl acetate and acrylonitrile.
8. The cell of claim 7 wherein said coating is applied to said anode and to said separator.
9. An electrochemical cell comprising:
(a) a cathode current collector;
(b) an ionically conductive electrolyte in physical contact with said anode and cathode current collector; said electrolyte consisting of a solute dis- solved in a solvent that is also the active cathode depolarizer; and
(c) an anode that forms surface compounds when in intimate contact with said active cathode depolarizer, said anode being, mechanically spaced from said current collector;
(d) a passivation limiting film contiguous to said anode, said film consisting of acrylonitrile.

10. In a method of reducing passivation in an electrochemical cell having a lithium anode, a cathode current collector spaced from said anode, and ionically conductive electrolyte consisting of a solution of an ionically conductive solute dissolved in thionyl chloride; the steps comprising:
(a) prior to assembly, coating said anode with a liquid organic compound that cures to an adherent film; said compound being chosen from the group consisting of methyl cyanoacrilate, ethyl cyanoacrylte, ethyl acetate and acrylonitrile;
(b) curing said film;
(c) assembling said coated anode into said cell; and
(d) burning-in said cell.

11. The method of claim 10 wherein said liquid organic compound is methyl cyanoacrylate.

12. The method of claim 10 wherein said liquid organic compound is ethyl cyanoacrylate.

13. In a method of reducing the passivation in an electrochemical cell having a lithium anode, a cathode current coolector, a separator spaced between said anode and said cathode current collector, and an ionically conductive solute dissolved in thionyl chloride, the steps comprising:
(a) prior to assembly, coating said separator in with a liquid organic compound that cures to an adherent film said liquid organic compound selected from the group consisting of: methyl cyanoacrilate, ethyl cyanoacrilate, ethyl acetate and acrylonitrile;
(b) curing said film;
(c) assembling said separator into said cell; and
(d) burning-in said cell.

14. The method of claim 13 wherein said liquid organic compound is methyl cyanoacrylate.

15. The method of claim 14 wherein said liquid organic compound is ethyl cyanoacrylate.

* * * * *